(12) United States Patent
Pereira Da Silva et al.

(10) Patent No.: US 10,506,546 B2
(45) Date of Patent: Dec. 10, 2019

(54) METHOD OF LOCATING AN ACCESS POINT TO A COMMUNICATION NETWORK

(71) Applicant: COMMISSARIAT À L'ÉNERGIE ATOMIQUE ET AUX ÉNERGIES ALTERNATIVES, Paris (FR)

(72) Inventors: Alex Pereira Da Silva, Saint Martin d'heres (FR); Sylvain Leirens, Pierre Chatel (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/150,859

(22) Filed: Oct. 3, 2018

(65) Prior Publication Data

US 2019/0110272 A1    Apr. 11, 2019

(30) Foreign Application Priority Data

Oct. 6, 2017   (FR) .................................... 17 59406

(51) Int. Cl.
*H04W 64/00* (2009.01)
*H04B 17/318* (2015.01)
*H04W 4/02* (2018.01)

(52) U.S. Cl.
CPC ........ *H04W 64/006* (2013.01); *H04B 17/318* (2015.01); *H04W 4/027* (2013.01); *H04W 64/003* (2013.01)

(58) Field of Classification Search
CPC .... G01S 5/0242; G01S 5/0252; G01S 5/0284; G01S 5/06; G06F 17/509; H04B 17/318;

(Continued)

(56) References Cited

U.S. PATENT DOCUMENTS

2010/0238862 A1* 9/2010 Davidson .............. H04W 4/029
                                                         370/328
2010/0321239 A1* 12/2010 Rossi .................... G01S 5/0268
                                                         342/387

(Continued)

FOREIGN PATENT DOCUMENTS

EP       2 500 743 A1    9/2012

OTHER PUBLICATIONS

Search Report for French Application No. 17 59406 dated Jul. 18, 2018.

(Continued)

*Primary Examiner* — Quoc Thai N Vu
(74) *Attorney, Agent, or Firm* — Pearne & Gordon LLP

(57) ABSTRACT

A method of localising an access point (B1, B2, B3) to a communication network; The method comprises the following steps: reconstruction of a trajectory (P1, P2, P3, P4) followed by a mobile device during a displacement during which it makes measurements of an indicator related to the distance separating it from the access point; determination of a localisation (T1, T2, T3) at which each of the measurements on the trajectory is made; calculation for each measurement of a difference between the distance separating a possible localisation of the access point from the location at which the measurement is made and a distance estimated from the measurement and a propagation model relating the indicator and the distance, and calculation of a localisation error from the calculated differences. The propagation model is updated at each evaluation of a possible localisation of the access point.

12 Claims, 4 Drawing Sheets

(58) Field of Classification Search
CPC ......... H04W 4/04; H04W 4/33; H04W 4/027; H04W 64/006; H04W 64/003
See application file for complete search history.

(56) References Cited

U.S. PATENT DOCUMENTS

| | | |
|---|---|---|
| 2011/0059752 A1 | 3/2011 | Garin et al. |
| 2011/0304503 A1* | 12/2011 | Chintalapudi ........ G01S 5/0252 342/357.29 |
| 2013/0288704 A1* | 10/2013 | Wirola .................. H04W 64/00 455/456.1 |
| 2015/0172854 A1 | 6/2015 | Stogaitis et al. |
| 2016/0337811 A1* | 11/2016 | Astrom ................. G01S 5/0242 |
| 2017/0215166 A1 | 7/2017 | Disatnik et al. |

OTHER PUBLICATIONS

Zhuang, Yanu et al. "Fast WiFi Access Point Localization and Autonomous Crowdsourcing" IN: Ubiquitous Positioning Indoor Navigation and Location Based Service (UPINLBS), 2014.
Yang, Jie et al. Indoor Localization Using Improved RSS-Based Lateration Methods, Global Telecommunications Conference, 2009.

* cited by examiner

METHOD OF LOCATING AN ACCESS POINT TO A COMMUNICATION NETWORK

TECHNICAL DOMAIN

The domain of the invention is wireless communication networks. The invention is most particularly applicable to localisation in the environment of a wireless access point to a communication network, such as a Wi-Fi hotspot, and an estimate of a propagation model for such a hotspot.

STATE OF PRIOR ART

Techniques classically used to localise Wi-Fi hotspots are based on estimates of distances between hotspots and users of mobile terminals. These distances can be estimated by different methods, such as those making use of the RTT ("Round-Trip Time"), the TDoA ("Time Difference of Arrival"), and the AoA ("Angle of Arrival"). However, these techniques require some information about the absolute position of at least one Wi-Fi hotspot, or the positions of mobile users.

Another approach consists of directing a user to a Wi-Fi hotspot by continuously measuring the signal intensity received by his or her mobile terminal. The constraint of this approach is that the user cannot freely move about in his or her environment.

The paper by Zhuang, Y. et al., "Fast Wi-Fi Access Point Localization and Autonomous Crowdsourcing", Ubiquitous Positioning Indoor Navigation and Location Based Service (UPINLBS), 2014 describes a technique that can be used to estimate the localisation of a Wi-Fi hotspot and its propagation model using a crowdsensing approach that makes use of measurements of a "Received Signal Strength Indicator" (RSSI) from several users moving around freely in their environment. This technique makes it necessary for each user mobile terminal to integrate a "Trusted Portable Navigator" system that designates a navigator that integrates both inertial sensors and a satellite navigation system) capable of providing the position of the user at each measurement point. The resolution of a system of equations using the weighted nonlinear least squares method can be used to estimate the localisation of the Wi-Fi hotspot and the values of the parameters of its propagation model.

The paper by Yang, J. et al., "Indoor Localization Using Improved RSS-Based Lateration Methods", Global Telecommunications Conference, 2009, presents a method that can also estimate a propagation model, but with the disadvantage that several Wi-Fi hotspots are necessary. The parameters of the propagation model and the position of the hotspot are determined all at the same time using an iterative algorithm that solves a nonlinear problem.

PRESENTATION OF THE INVENTION

The invention follows the approach outlined in the paper by Zhuang, Y. et al. mentioned above in that it discloses a technique for estimating the localisation of a Wi-Fi access point and its propagation model using a "crowdsensing" approach to collect measurements made by users moving about freely in their environment. More specifically, the invention discloses a technique for relative localisation of the hotspot with respect to the user that does not require any information about the localisation of the hotspot nor any information about the localisation of users.

The invention also relates to a method of localising a wireless access point to a communication network, comprising the following steps:
reconstruction of a trajectory followed by a mobile device during a displacement during which the mobile device makes successive measurements of an indicator related to the distance separating the mobile device from the access point;
determination of a localisation at which each of said measurements on the trajectory is made;
selection and evaluation of a possible localisation of the access point, said evaluation including the calculation, for each measurement among all or some of said measurements, of a difference between the distance separating the possible localisation of the access point and the localisation at which the measurement is made, and a distance estimated using the measurement and a propagation model relating said indicator and the distance and the calculation of a localisation error from the calculated differences.

Unlike the technique presented in the paper by Zhuang, Y. et al., the invention evaluates the probable position of a hotspot using a simple linear procedure and uses the relation between the RSSI type indicator and the distance (propagation model) to refine the estimate of the position of the hotspot and the propagation model.

The evaluation of a possible localisation of an access point further comprises an update of the propagation model. Hence, said evaluation comprises the determination of parameters of the propagation model starting from all or some of the measurements and distances separating the possible localisation of the access point from each of the localisations at which a measurement is made.

Some preferred but non-limitative aspects of this method are defined in the dependent claims.

BRIEF DESCRIPTION OF THE DRAWINGS

Other aspects, purposes, advantages and characteristics of the invention will become clear after reading the following detailed description of preferred embodiments of the invention, given as non-limitative examples, with reference to the appended drawings among which.

DETAILED PRESENTATION OF PARTICULAR EMBODIMENTS

The invention relates to a method of localising a wireless access point to a communication network. The method makes use of measurements made by a mobile device of an indicator related to the distance separating the mobile device from the access point. These measurements are made successively by the mobile device during its displacement in its environment. This displacement is free, i.e. not imposed. The indicator may for example be a reception power indicator RSSI.

The mobile device is a wireless communication apparatus transported by a user or integrated into a robot. The user or the robot makes a displacement in an environment in which wireless communication apparatus might detect one or several access points. In one example embodiment, the mobile device is a smartphone and the access point(s) is (are) Wi-Fi hotspots. However, the invention is applicable to other types of devices and other types of access points such as Bluetooth beacons or base stations in a cellular network.

The method includes different steps, each of which can be carried out indifferently by a processor of the mobile device itself or by a processor of a remote server to which the necessary data are forwarded (for example the indicator measurements).

The method comprises a step to reconstruct a trajectory followed by the mobile device during the displacement. This reconstruction makes use of an odometry algorithm making use of measurements made by one or several sensors on board the mobile device.

In one possible embodiment, the odometry algorithm is a Pedestrian Dead Reckoning (PDR) algorithm including detection of steps and walking direction changes during the displacement. Detection of steps is typically done using an accelerometer, and the direction change is typically detected using a gyroscope or gyrometer. The reconstructed trajectory is thus composed of a succession of straight segments, in which each end of a segment models one step and in which an angle between two successive segments models a change in the walking direction.

Figure 1:
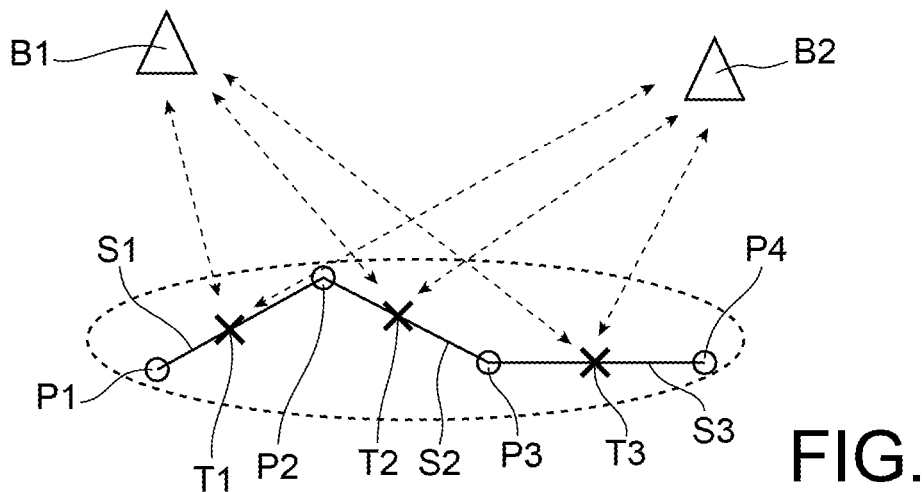
FIG. 1 is a diagram representing reconstruction of the trajectory followed by the mobile device during a displacement in which it detects two wireless access points.

FIG. 1 represents an example reconstruction of a trajectory followed by a mobile device during a displacement in which it detects two wireless access points B1, B2. The trajectory comprises three segments, the ends P1, P2, P3, P4 of which correspond to steps made by the user of the mobile device. Each of these steps is time dated, with $t_{sj}$ being the instant at which the step s of a user j is detected.

The invention includes other trajectory reconstruction methods such as "ranging" that is a technique by which robots can detect obstacles in the environment by means of sensors (cameras, LIDAR, SONAR, etc.) installed on them. If the positions of obstacles are known, the robot can plot its entire trajectory (displacement and direction change).

During its displacement, the mobile device detects access points B1, B2 and for each access point, makes measurements of the power indicator of the received signal. This indicator varies approximately with the inverse of the distance separating the mobile device (at the time the measurement is made) from the access point corresponding to the measurement. Considering the example in FIG. 1 once again, measurements of indicator T1, T2, T3 are made during the displacement and after reconstruction of the trajectory, the method includes a step to determine a localisation at which each of said measurements on the trajectory is made.

Knowing the instants at which measurements of the indicator are made ($t_{kj}$ is thus the instant at which the k-th measurement is made by the user j), and the reconstructed trajectory (in which $t_{sj}$ is the instant at which the step s of a user j is detected and $(\bar{x}_{sj}, \bar{y}_{sj})$ is the localisation of step s estimated by reconstruction of the trajectory), it is possible to determine the localisation at which each measurement on the trajectory is made. For example, when $t_{s-1j} < t_{kj} \le t_{sj}$, the localisation $(x_{kj}, y_{kj})$ at which the k-th measurement of the user j is made is expressed as follows:

$$\begin{cases} x_{kj} = \bar{x}_{sj} - \Delta t_{ksj}(\bar{x}_{sj} - \bar{x}_{s-1j}) \\ y_{kj} = \bar{y}_{sj} - \Delta t_{ksj}(\bar{y}_{sj} - \bar{y}_{s-1j}) \end{cases}, \text{ in which } \Delta t_{ksj} = \frac{t_{sj} - t_{kj}}{t_{sj} - t_{s-1j}}.$$

The method includes the selection of a possible localisation of the access point and an evaluation of this possible localisation.

This evaluation includes the calculation for each measurement among all or some of said measurements, of a difference between:
the distance separating the possible localisation of the access point from the localisation at which the measurement is made; and
a distance estimated using the measurement and a propagation model that relates the indicator and the distance.

Considering the k-th measurement of the indicator $RSSI_k$ along the trajectory, the difference $d_k - \hat{d}_k$ is thus calculated in which $d_k$ denotes the distance separating the possible localisation of the access point from the localisation at which the measurement is made and $\hat{d}_k$ denotes the distance estimated from the k-th $RSSI_k$ measurement using the propagation model. In this calculation, the user's localisation is not required to determine a relative localisation of the hotspot with respect to the user. This relative localisation is determined using the measurement and the propagation model. The localisation of the user, as determined from reconstruction of the trajectory, is used to calculate a possible relative localisation of the access point with respect to the user.

Evaluation of the possible localisation of the access point also includes a calculation of a localising error starting from the calculated differences. This calculation may include determining the square of each difference and accumulating the squares of the differences. This quadratic error is thus written $E = \sum_{k=1}^{K}(d_k - \hat{d}_k)^2$ in which K denotes the number of measurements considered.

The evaluation of the possible localisation of the access point includes determination of parameters of the propagation model starting from all or some of the $RSSI_k$ measurements and distances $d_k$ separating the possible localisation of the access point from each of the localisations at which a measurement is made. Since the RSSI is expressed in dBm, the distance between the localisation at which the indicator measurement is made and an access point may for example be expressed according to the propagation model $d_k = a \cdot e^{b \cdot RSSI_k}$, in which a and b are parameters to be estimated, $d_k$ is the distance and $RSSI_k$ is the measurement of the indicator.

Figure 2:
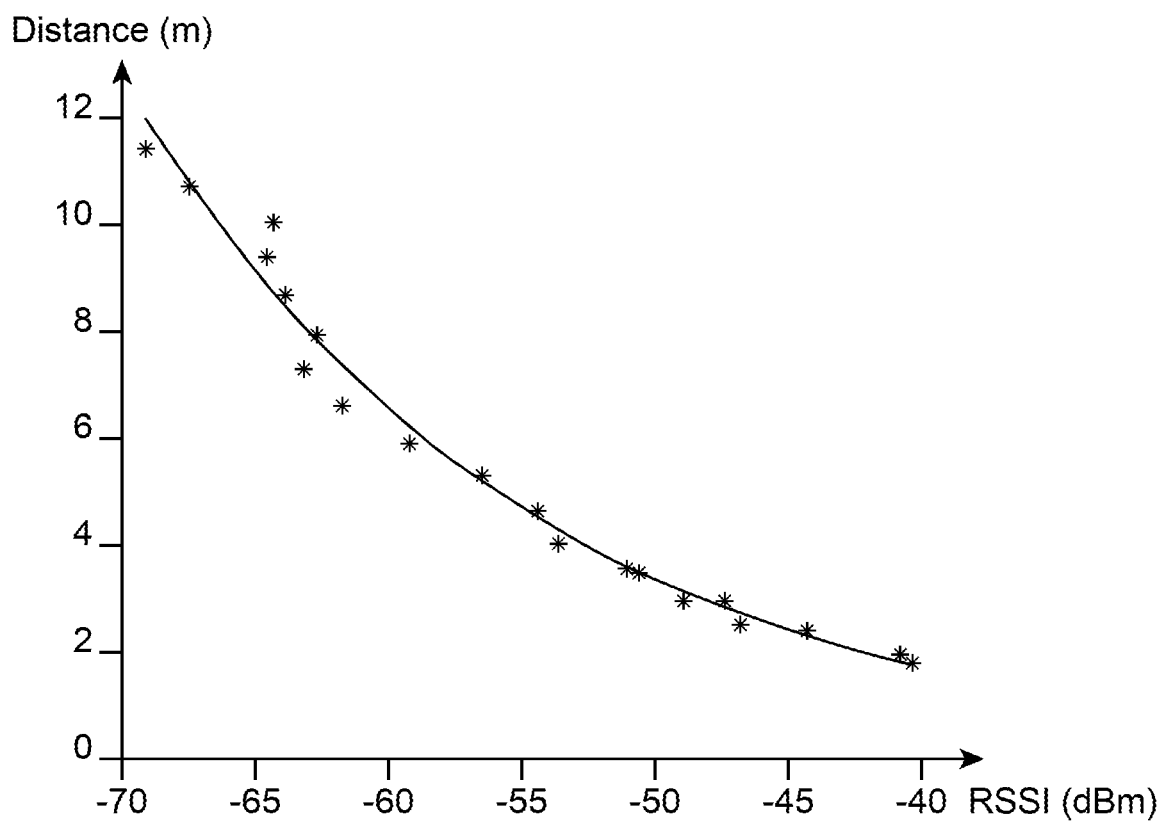
FIG. 2 is a diagram that illustrates determination of the parameters of a propagation model capable of relating the measured indicator to the relative distance of the hotspot with respect to the mobile device.

As shown on FIG. 2, the measurements of the $RSSI_k$ indicator made during displacement can be put into order from the smallest to the largest (these measurements correspond to discrete values represented by stars on the figure), to associate with them the distances $d_k$ separating the possible localisation of the access point from each of the localisations at which a measurement is made. A decreasing exponential regression on these measurements can be made to estimate parameters a and b of the propagation model (the relation thus estimated between distance and RSSI is represented by the solid line curve on the figure).

In one possible embodiment, the measurements made by several users can be collected by a server that determines the parameters of the propagation model making use of multiuser measurements. Since more measurements are thus available, the estimate of parameters of the propagation model is more robust.

It will be noted that the relation between the measurements of the indicator and the distance can be modelled in different ways: polynomial regression, interpolation, etc. These different models can be adapted to the characteristics of the environment (for example attenuations due to obstacles, changing characteristics during a day). Furthermore, a criterion other than the least squares can also be used to calculate the error between the estimated propagation curve and the real values of the indicator (for example weighted least squares), for example to take account of uncertainty on a measurement of an indicator.

The method according to the invention preferably includes the selection and evaluation of a plurality of possible localisations of the access point, and the determination of the localisation of the access point as being the possible localisation associated with the lowest localisation error. The propagation model determined during the evaluation of this location is considered to be the most reliable.

Figure 3:
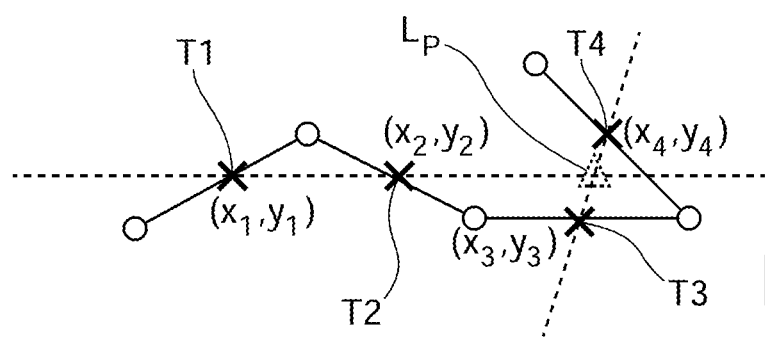
FIG. 3 is a diagram that illustrates a possible embodiment of the selection of possible localisations of an access point.

A plurality of possible localisations can be selected from among the localisations each consisting of the intersection of two straight lines, each of the two straight lines connecting two localisations at which one of said measurements are made. With reference to FIG. 3, two pairs of localisations at which an indicator is measured are chosen, namely T1, T2 and T3, T4. The localisations at which a measurement forming a pair is made do not need to be in succession along the trajectory. The same applies for the two pairs. The intersection of straight lines passing through T1-T2 and through T3-T4 respectively determines a possible localisation Lp of the access point.

The possible localisation Lp: (x,y) of the hot spot can be determined using the following linear equations:

$$\begin{cases} x = \dfrac{y_3 - y_1 + m_1 x_1 - m_2 x_3}{m_1 - m_2} \\ y = y_1 + m_1(x - x_1) \end{cases}$$

in which $$m_1 = \dfrac{y_2 - y_1}{x_2 - x_1} \text{ and } m_2 = \dfrac{y_4 - y_3}{x_4 - x_3}$$

are angular coefficients of the two straight lines connecting points T1: $(x_1, y_1)$ and T2: $(x_2, y_2)$, and points T3: $(x_3, y_3)$ and T4: $(x_4, y_4)$, respectively.

This selection of a possible localisation of the hotspot at an intersection of straight lines is based on the fact that as the number of measurements increases, the probability of having measurements aligned with the hotspot also increases. Such a selection would not be efficient for a user who is walking straight while the hotspot is located in a region perpendicular to his trajectory. In such a case, the measurements of another user travelling along another trajectory could be considered to help localise the hotspot.

In a variant embodiment making it possible to reduce the calculation time, several closes measurement localisations can be shared to form a pooled localisations that will be used for the determination of the lines. The pooled localisation is for example the center of gravity of several measurement localisations and it is associated as measurement value for instance the average of the measurements acquired in these localisations.

In another variant embodiment, it is possible to delete from the list of possible localisations (determined by lines crossings) localisations for which, when following one of the straight lines toward the intersection, the value of the indicator decreases. In such a case indeed, the intersection of the lines cannot form a conceivable possible localisation, and it is not integrated in the rest of the process.

Figure 5:
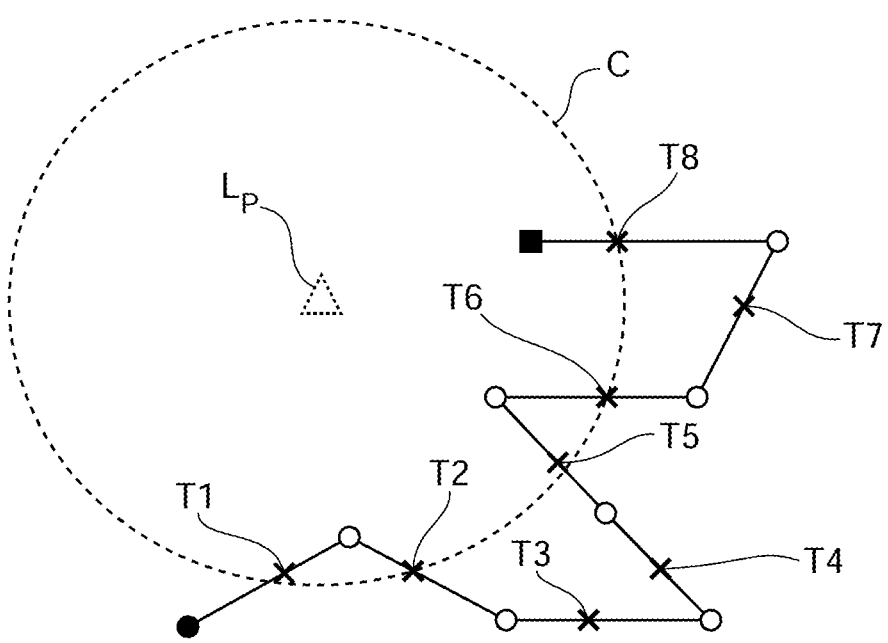
FIG. 5 is a diagram that illustrates another possible embodiment of the selection of possible localisations of an access point.

FIG. 5 illustrates another method of selecting a possible localisation of the access point. According to this method, when the measurements of the indicator along the trajectory have similar values (for example values with a difference less than a predetermined similarity factor), an attempt can be made to determine the circle passing as close to the localisations at which these measurements are made as possible, for example in the sense of least squares. The centre of this circle defines the possible localisation of the access point. On FIG. 5, measurements at localisations T1, T2, T5, T6 and T8 are similar. The centre of the circle C passing as close to these localisations as possible is one possible localisation of the access point.

Considering once again the example of the selection of possible localisations according to the method in FIG. 3, the number of possible localisations for a trajectory with K measurements is $$K + \sum_{j=3}^{K-1} j \cdot \binom{j-1}{2}$$

for K≥3 (in which K=3, the possible localisation coincides with the localisation at which a measurement is made). This number of possible localisations increases exponentially with the number of measurements.

To reduce the number of possible localisations to be evaluated, it would be possible to take account firstly of the fact that attenuations are larger for measurements made of the indicator furthest from the access point, and secondly that positions close to each other involve similar propagation models.

In one possible embodiment, a threshold on the indicator measurements is defined to take account of large attenuations at a distance from the hotspot. For example, this threshold is related to the maximum or minimum measured value. Each of these measurements is compared with this threshold, and when a measurement is less than the threshold, it is considered that this measurement is not very reliable since it was made at a long distance from the hotspot. This measurement is then not considered in the determination of the parameters of the propagation model made at each evaluation of a possible localisation of the hotspot. Otherwise, estimating errors could be introduced into the distances $\hat{d}_k$ estimated using the propagation model, which could generate errors in estimating the localisation of the access point.

Still with the objective of taking account of large attenuations at a distance from the hotspot, in another embodiment implemented in addition to or instead of the embodiment presented above, differences are only calculated when evaluating a possible localisation of the hotspot for measurements larger than a threshold. Thus, for a trajectory including making K measurements, only a fraction of these measurements are used, namely measurements that have the largest indicators.

The threshold mentioned above can be adapted to measurements of the indicator, for example to relate this threshold to an uncertainty on the measurement of the indicator.

Still with the objective of reducing the number of possible localisations to be evaluated, in yet another embodiment that can be implemented jointly or alternatively with one and/or the other of the embodiments presented above, a possible localisation of the access point is not selected when this possible localisation is present is a nearby area including a first possible localisation for which the associated localisation error is more than the localisation error associated with a second possible localisation. The proximity area may for example be a circle with radius r centred on the first possible localisation. The radius may for example be chosen to be twice the length between two steps. The proximity area may be in shapes other than circular. For example, in a building with a corridor, the proximity area may be elliptical in shape. The extent of the proximity area may also depend on the value of indicator measurements, for example with a different extent depending on a level associated with the measurement (for example low, medium and high).

Figure 4:
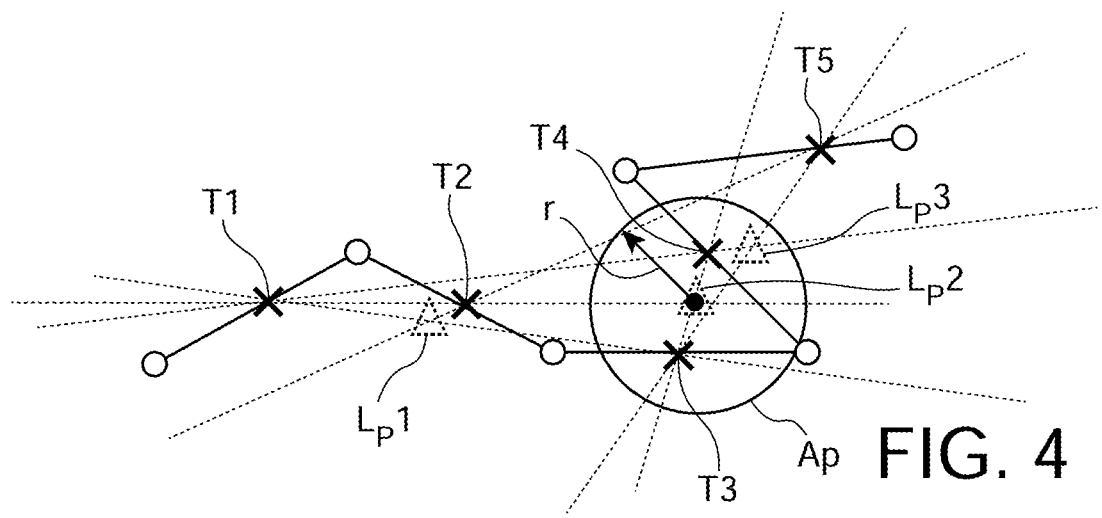
FIG. 4 is a diagram that illustrates a variant embodiment of the selection of possible localisations of an access point for which localisations considered to be improbable are not evaluated.

With reference to FIG. 4, an evaluation of a first possible localisation Lp2 at the intersection of the straight line passing through the localisations at which measurements T3 and T4 are made and the straight line passing through the localisations at which measurements T1 and T2 are made gives a first localisation error. And an evaluation of a second possible localisation Lp1 at the intersection of the straight line passing through the localisations at which measurements T1 and T3 are made and the straight line passing through the localisations at which measurements T2 and T5 are made gives a second localisation error. The first localisation error (at Lp2) is larger than the second localisation error (at Lp1), such that the first possible localisation Lp2 is considered to be improbable. A proximity area Ap centred on this improbable localisation Lp2 is defined, in this case a circle with radius r. The possible localisations present in this circle are not selected to make an evaluation. This is case for the possible localisation Lp3 located at the intersection of the straight line passing through the localisations at which measurements T1 and T4 are made and the straight line passing through the localisations at which measurements T3 and T5 are made.

Figure 6:
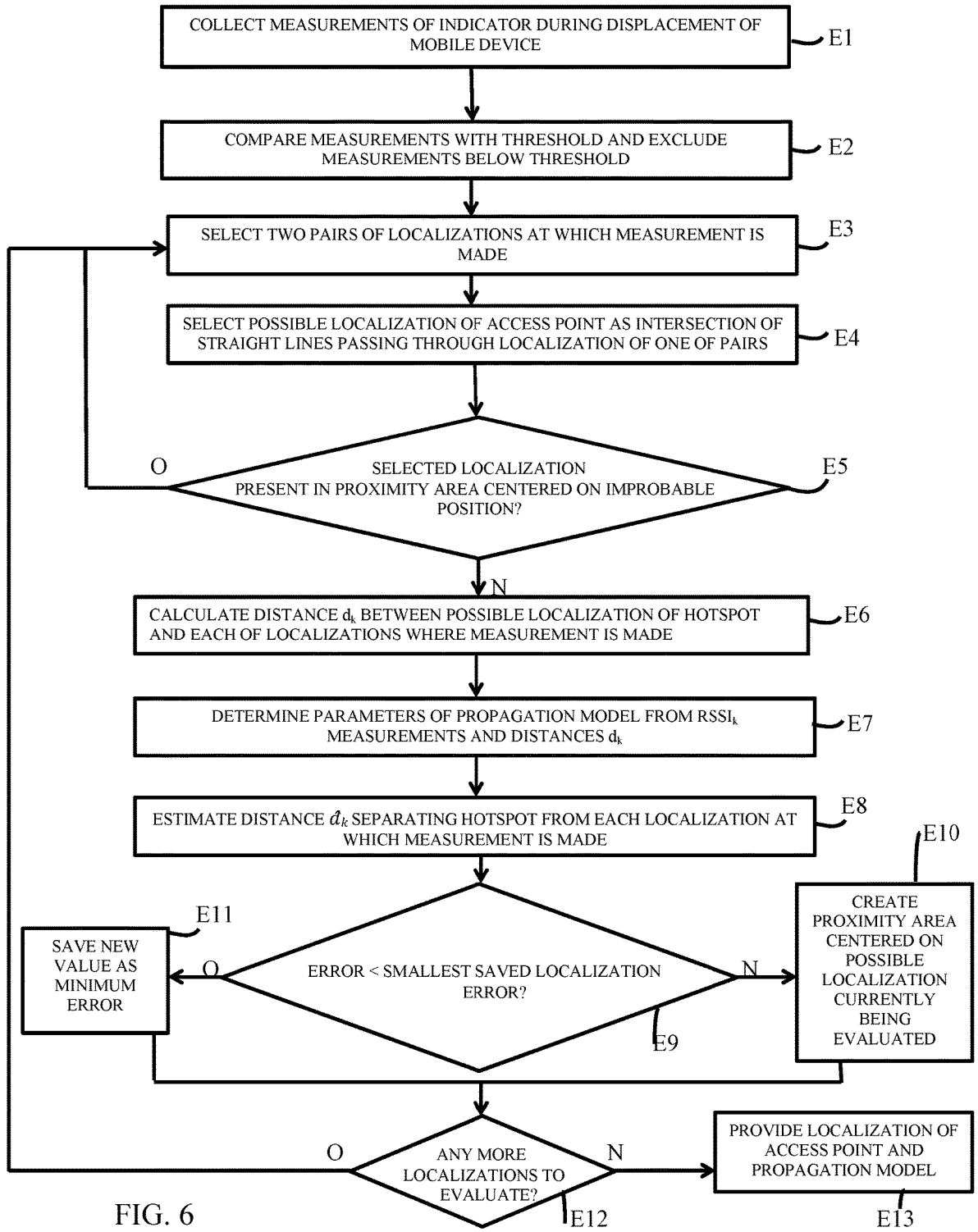
FIG. 6 is a flowchart of a localisation method according to one possible embodiment of the invention.

FIG. 6 represents a flowchart of a localisation method according to one possible embodiment of the invention. This method begins with a step E1 in which measurements of the indicator made during displacement of the mobile device are collected. During step E2, these measurements are compared with a threshold to exclude measurements below this threshold. Step E3 consists of selecting two pairs of localisations at which a measurement is made. Step E4 consists of selecting a possible localisation of the access point as being the intersection point of straight lines each passing through the localisations of one of said pairs. In step E5, it is checked if the selected possible localisation is present in a proximity area centred on an improbable position. If so ("O"), a new possible localisation is selected looping back to step E3. If not ("N"), a step E6 is performed to calculate distances $d_k$ between the possible localisation of the hotspot and each of the localisations at which a measurement is made. In step E7, the parameters of the propagation model are determined from the $RSSI_k$ measurements and distances $d_k$. Step E8 uses each measurement and the previously determined propagation model to estimate the distance $\hat{d}_k$ separating the hotspot from each localisation at which a measurement is made. The localisation error $E=\Sigma_{k=1}^{K}(d_k-\hat{d}_k)^2$ is then calculated. In step E9, it is checked if this error is less than the smallest localisation error saved at this stage. If so ("O"), the new value is saved as the minimum error, in a step E11. If not ("N"), a proximity area is created during a step E10 centred on the possible localisation currently being evaluated. In step E12, it is checked if there are any more possible localisations to be evaluated. If not ("N"), the process is terminated (step E13) providing the localisation of the access point and the propagation model. If so ("O"), a loop back to step E3 is made to evaluate a new possible localisation.

Figure 7:
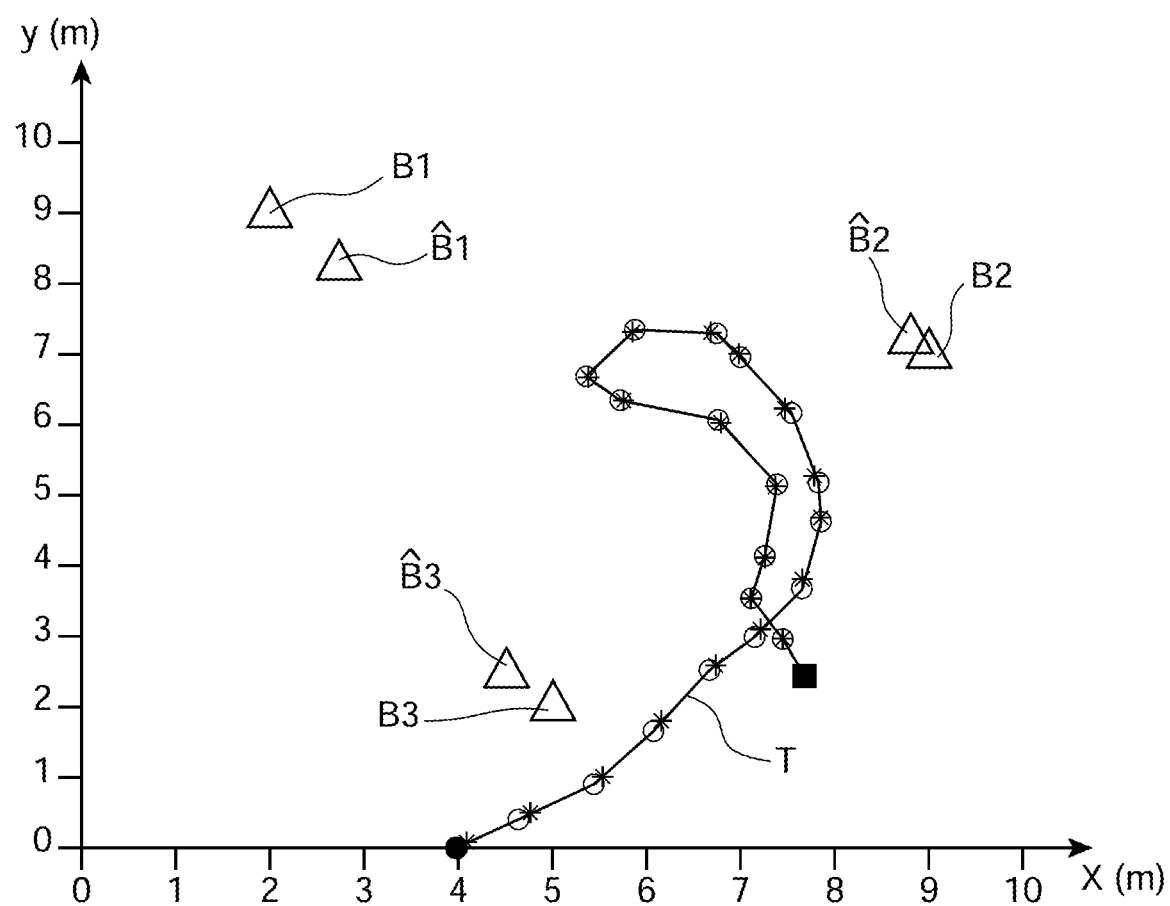
FIG. 7 illustrates reconstruction of the trajectory followed by a mobile device for localisation of three access points.

FIG. 7 represents a simulation of a displacement of a user in a 10 m*10 m rectangular building in which he or she detects a Wi-Fi network with three access points B1, B2, B3, each having its own identifier. Twenty measurements of the RSSI are made during this displacement and are shown on the reconstruction of the trajectory T determined by means of a pedestrian dead reckoning navigation. The user's initial position is (x,y)=(4,0) that can represent the entry into the building. With 20 measurements, and choosing possible localisations as being the intersection of straight lines passing through a pair of these measurements, there are 14555 possible localisations that have to be evaluated. This figure can be considerably reduced by threshold and improbable position proximity area criteria. In this case the threshold is the same for all hotspots, namely 1.6 times the maximum measurement among all the hotspots (since RSSI measurements are negative, see FIG. 2, this threshold is more than 1). The proximity areas are circles, of which the radius is equal to twice the length of a step (considered to be constant during the displacement) estimated by means of pedestrian dead reckoning navigation. On FIG. 7, $\hat{B}_1$, $\hat{B}_2$ and $\hat{B}_3$ represent the estimated localisations of hotspots B1, B2 and B3 making use of the method according to the invention.

The following table illustrates the performance of the localisation method according to the invention.

| Hotspot | Real hotspot localisation | Estimated hotspot localisation | Distance error (m) | Number of measurements eliminated by the threshold | Number of improbable localisation proximity areas | Number of evaluated possible localisations |
| --- | --- | --- | --- | --- | --- | --- |
| B1 | (2, 9) | (2.74, 8.26) | 1.05 | 13 | 98 | 31 |
| B2 | (9, 7) | (8.81, 7.19) | 0.28 | 3 | 6700 | 524 |
| B3 | (5, 2) | (4.52, 2.48) | 0.67 | 0 | 13515 | 1116 |

For hotspot B3, no measurements were eliminated by the threshold criterion. Despite this, an evaluation was made for only 8% of possible localisations. It is found that the estimating error for hotspot B2 is less than that for hotspot B3 despite the fact that no RSSI measurement was eliminated for hotspot B3. This is explained by the fact that most localisations at which RSSI measurements are made are closer to the B2 hotspot, which refines its estimate. It is also found that hotspot B1 comprises a larger distance error, specifically because of the low values of RSSI, this hotspot B1 being the furthest from the trajectory T.

The invention is not limited to the method described above, but also includes a computer program including program code instructions for the execution of this method when said program is executed on a computer. The method may be executed either by a server, or locally in the mobile device. The invention also includes an apparatus with a processor specifically configured to implement this method, and particularly the mobile device itself. The method may also be implemented jointly by the mobile device and the server, for example with the mobile device that reconstructs the trajectory and the server that makes the selection and evaluation of possible localisations.

The following are possible applications of the localisation obtained by the invention.

Knowing the localisation of the access point, the user can move towards the access point so as to increase its reception power and thus have a better quality connection.

Knowledge of the localisation of access points can also enable a user to positioning himself, particularly inside a building when the GPS cannot be used. For example, a user who enters a building loses his GPS signal. But if the localisations of access points have already been estimated by other users in the building, the new user can continue to localise his position inside the building.

The distance estimated by application of the propagation model determined using the different measurements can be used to improve localisation. For example, in the case in which a few measurements of user dead reckoning navigation are uncertain, this estimated distance can help to refine the localisation.

The invention claimed is:

1. A method of localising a wireless access point to a communication network, comprising the steps of:
    reconstructing a trajectory followed by a mobile device during a displacement during which the mobile device makes successive measurements of an indicator related to the distance separating the mobile device from the access point;
    determining, for each of said measurements, a localisation on the trajectory at which said measurement is made;
    selecting and evaluating a possible localisation of the access point, said evaluating including:
        using all or some of the measurements and the distances separating the possible localisation of the access point from each of the localisations at which a measurement is made, determining parameters of a propagation model relating said indicator and the distance;
        calculating, for each measurement among all of some of said measurements, of a difference between the distance separating the possible localisation of the access point and the localisation at which the measurement is made, and a distance estimated using the measurement and the propagation model; and
        calculating a localisation error from the calculated differences.

2. The method according to claim 1, in which determining the parameters of the propagation model includes a decreasing exponential regression made on all or some of the measurements.

3. The method according to claim 1, comprising the comparison of each of said measurements with a threshold and in which a measurement below the threshold is ignored in the determining of the parameters of the propagation model.

4. The method according to claim 1, comprising the comparison of each of said measurements with a threshold and in which a difference is calculated during said evaluating for each measurement above the threshold.

5. The method according to claim 1, comprising selecting and evaluating a plurality of possible localisations of the access point, and determining the localisation of the access point as being the possible localisation associated with the lowest localisation error.

6. The method according to claim 5, in which a possible localisation of the access point is not selected when this possible localisation is present in a proximity area including a first possible localisation which has an associated localisation error larger than the localisation error associated with a second possible localisation.

7. The method according to claim 6, in which selecting a plurality of possible localisations of the access point comprises selecting localisations from among localisations each being the intersection of two straight lines, each of the two straight lines connecting two localisations at which one of said measurements is made.

8. The Method according to claim 6, in which selecting a plurality of possible localisations of the access point comprises selecting localisations from among localisations each being the centre of a circle passing at the closest to the localisations at which similar measurements are made.

9. The method according to claim 1, in which reconstructing the trajectory followed by the mobile device includes pedestrian dead reckoning navigation making use of a step and walking direction change detection during the displacement.

10. The method according to claim 1, in which the indicator related to the distance separating the mobile device from the access point is a reception power indicator.

11. A non-transitory computer program including program code instructions for performing the method according to claim 1 when said program is executed on a computer.

12. An apparatus comprising a processor configured to perform the method according to claim 1.

* * * * *